United States Patent
Sandhu

(10) Patent No.: US 7,500,795 B2
(45) Date of Patent: Mar. 10, 2009

(54) APPARATUSES, SYSTEMS AND METHODS FOR ENHANCING TELEMEDICINE, VIDEO-CONFERENCING, AND VIDEO-BASED SALES

(75) Inventor: Gurpal Sandhu, Honolulu, HI (US)

(73) Assignee: Paul Sandhu, Honolulu, HI (US)

( * ) Notice: Subject to any disclaimer, the term of this patent is extended or adjusted under 35 U.S.C. 154(b) by 496 days.

(21) Appl. No.: 11/223,647

(22) Filed: Sep. 9, 2005

(65) Prior Publication Data

US 2006/0051084 A1    Mar. 9, 2006

Related U.S. Application Data

(60) Provisional application No. 60/609,042, filed on Sep. 9, 2004.

(51) Int. Cl.
*G03B 17/00* (2006.01)
(52) U.S. Cl. .................... 396/428; 348/143; 348/151; 348/153; 348/156
(58) Field of Classification Search ................. 396/428, 396/427.428; 348/14.01, 14.02, 14.05, 14.11, 348/14.15, 207.99, 211.12, 143, 148, 151, 348/153, 156
See application file for complete search history.

(56) References Cited

U.S. PATENT DOCUMENTS

| | | | |
|---|---|---|---|
| 6,434,329 B1 * | 8/2002 | Dube et al. | 396/14 |
| 6,804,656 B1 * | 10/2004 | Rosenfeld et al. | 705/3 |
| 7,015,954 B1 * | 3/2006 | Foote et al. | 348/218.1 |
| 2003/0020805 A1 * | 1/2003 | Allen et al. | 348/14.07 |
| 2003/0062997 A1 * | 4/2003 | Naidoo et al. | 340/531 |
| 2003/0231238 A1 * | 12/2003 | Chew et al. | 348/14.02 |
| 2004/0163118 A1 * | 8/2004 | Mottur | 725/105 |
| 2005/0099493 A1 * | 5/2005 | Chew | 348/14.08 |
| 2006/0122869 A9 * | 6/2006 | Rosenfeld et al. | 705/3 |

* cited by examiner

*Primary Examiner*—W. B. Perkey
*Assistant Examiner*—Warren K Fenwick

(57) ABSTRACT

A telesuite is provided which includes a camera rotatable about at least one axis, the camera being rotatably mounted to a fixed structure. A plurality of predetermined viewing positions are also provide, each of which includes a predetermined coordinate upon which the camera is focused. A camera controller is configured to rotate the camera to view a designated one of the predetermined viewing positions upon receipt of a control signal corresponding to the designated one of the predetermined viewing positions.

12 Claims, 12 Drawing Sheets

APPARATUSES, SYSTEMS AND METHODS FOR ENHANCING TELEMEDICINE, VIDEO-CONFERENCING, AND VIDEO-BASED SALES

CROSS-REFERENCE To RELATED APPLICATION

This application claims the benefit of the U.S. Provisional Application 60/609,042 filed on Sep. 9, 2004 and entitled "Apparatuses, Systems and Methods For Enhancing Telemedicine, Video-Conferencing, and Video-Based Sales" and this provisional application is hereby incorporated by reference in its entirety.

FIELD OF THE INVENTION

This disclosure generally relates to telemedicine, video-conferencing, and video-based sales. The disclosure more particularly relates to apparatuses, systems, and methods adapted to reduce delays caused by the movement and/or focusing of a movable camera used to view different areas of an originating site during telemedicine or video-conferencing sessions. The disclosure also relates to apparatuses, systems, and methods adapted to improve video-based sales using video-based communications mediums.

BACKGROUND OF THE INVENTION

The terms "telemedicine," "telehealth," "e-health" and the like are generally used to connote the use of telephony and/or other communication links (e.g., satellite) in combination with a camera (e.g., a still camera or a video camera) and/or a connected medical device or instrument (e.g., an electrocardiograph (ECG)) to convey sound, image, and data from a patient in a first location (e.g., an "originating site") to a doctor or other health care provider in a second, distal, location (e.g., a "remote site") to enable the doctor or health care provider to evaluate, advise, treat and/or diagnose the patient.

Now, emerging from its investigational phase, insurance carriers are increasingly providing coverage for telemedicine services. Legislatures are also recognizing the benefits of telemedicine to their constituents and many are developing or have developed laws to protect the citizens and to regulate this advance. As one example, California has passed laws promoting the acceptability of telemedicine including, but not limited to, Cal. Health and Safety Code § 1374.13, which recognizes telemedicine as a means for receiving medical services and establishes that certain telemedicine services are reimbursable under the Medi-Cal program and 1996 Cal. Stats., Chap. 902 (SB 2098), which authorizes the Medical Board of California to develop a proposed registration program permitting physicians, surgeons and podiatrists located outside the state to practice medicine across state lines if they meet the legal requirements of the state.

A number of publications have issued relating to the communications systems underlying telemedicine including, but not limited to, U.S. Published patent applications Nos. 2003/0144579, 2003/0231238, 2004/0039606, and 2004/0078825, the disclosures of which are all incorporated by reference in their entirety herein. However, little attention appears to have been directed to the patient space or, more particularly, the arrangement of the patient space to address the ergonomic and temporal needs of the doctors providing the telemedicine consult or services.

A need exists for improvements not only to interface between the doctor and patient, but also to the interface between the doctor and the patient space and/or the doctor and the originating facility or "telesuite" itself.

SUMMARY

In one aspect a telesuite comprises a camera rotatable about at least one axis, the camera being rotatably mounted to a fixed structure, and a plurality of predetermined viewing positions, each of which includes a predetermined coordinate upon which the camera is focused. The telesuite also comprises a camera controller configured to rotate the camera to view a designated one of the predetermined viewing positions upon receipt of a control signal corresponding to the designated one of the predetermined viewing positions. In one aspect thereof, at least two of the plurality of predetermined viewing positions are disposed substantially equidistant from the camera.

In another aspect, a telesuite comprises a camera rotatable about at least one axis and translatable along at least one of a substantially horizontal and a substantially vertical direction from a first origin position to a second origin position and a plurality of predetermined viewing positions, each of which includes a predetermined coordinate relative to at least one of the first origin position and second origin position upon which the camera is focused. A camera controller configured to cause said camera to perform at least one of a translation to a designated one of the first and second origin positions and a rotation to point the camera at a selected one of the plurality of predetermined viewing positions upon receipt of a corresponding control signal. The plurality of predetermined viewing positions comprising at least two predetermined viewing positions selected from the group consisting of a patient viewing area, a health care practitioner viewing area, a desk top area, a radiograph viewing device area, a physical exhibit viewing device area, a computer monitor, a television, a medical device display, and a medical instrument. In one aspect thereof, the two predetermined viewing positions are disposed substantially equidistant from the camera along a radial arc path of the camera.

In still another aspect, a telesuite comprises a camera rotatable about at least one axis, the camera being mounted to a fixed structure, a plurality of predetermined viewing positions, each of which includes a predetermined coordinate upon which the camera is focused, and a camera controller configured to rotate the camera to a designated one of the predetermined viewing positions upon receipt of a corresponding control signal. A first grouping of the plurality of predetermined viewing positions comprises at least a first predetermined viewing position and a second predetermined viewing position disposed substantially equidistant from the camera at a first radius from the camera and a second grouping of the plurality of predetermined viewing positions comprises at least a third predetermined viewing position and a fourth predetermined viewing position disposed substantially equidistant from the camera at a second radius from the camera.

In yet another aspect, a telesuite comprises a camera rotatable about at least one axis, a plurality of predetermined viewing positions, each of which includes a predetermined coordinate upon which the camera is focused, and a camera controller configured to rotate the camera to a designated one of the predetermined viewing positions upon receipt of a corresponding control signal. In this aspect, the camera controller is configured to automatically re-focus the camera during movement between a first predetermined viewing position and a second predetermined viewing position so that, upon completion of the camera movement, the camera is already at least substantially focused at a distance corresponding to a distance of the second predetermined viewing position from the camera.

A method for arranging a telemedicine suite is also disclosed and comprises the steps of providing a camera rotatable about at least one axis, the camera being mounted to at least one of a wall and a ceiling, providing a camera controller to control rotation of the camera, electrically connecting a computer having a processor to the camera controller and at least one of a hub, a router, a modem, and a transmitter, and providing software and/or an instruction set configured, upon execution by the processor, to store in a memory device operatively associated with the computer a plurality of predetermined viewing positions comprising a predetermined coordinate upon which the camera is focused.

A method is also provided for using a telemedicine suite comprising a camera fixed in a predetermined location and rotatable about at least one axis, comprising the steps of defining a plurality of predetermined viewing areas comprising a predetermined coordinate upon which the camera is focused, the plurality of predetermined viewing areas including a first predetermined viewing area and a second predetermined viewing area which are substantially equidistant from the camera, and rotating the camera from the first predetermined viewing area to the second predetermined viewing area during a telemedicine session, wherein the defining step includes associating the first predetermined viewing area with an area selected from a group consisting of a patient viewing area, a health care practitioner viewing area, a desk top area, a radiograph viewing device area, a physical exhibit viewing device area, a computer monitor, a television, a medical device display, a medical instrument, and a mirror, and associating said second predetermined viewing area with another member of the group.

The above summary is not intended to represent each embodiment, or every aspect, of the presently disclosed concepts. Additional features and benefits of the presently disclosed concepts will become apparent from the detailed description, figures, and claims set forth below.

DETAILED DESCRIPTION

The following description is exemplary of the disclosed concepts and advantageous aspects thereof, but is in no way intended to limit the scope of the disclosed concepts, its application, or uses.

Figure 1:
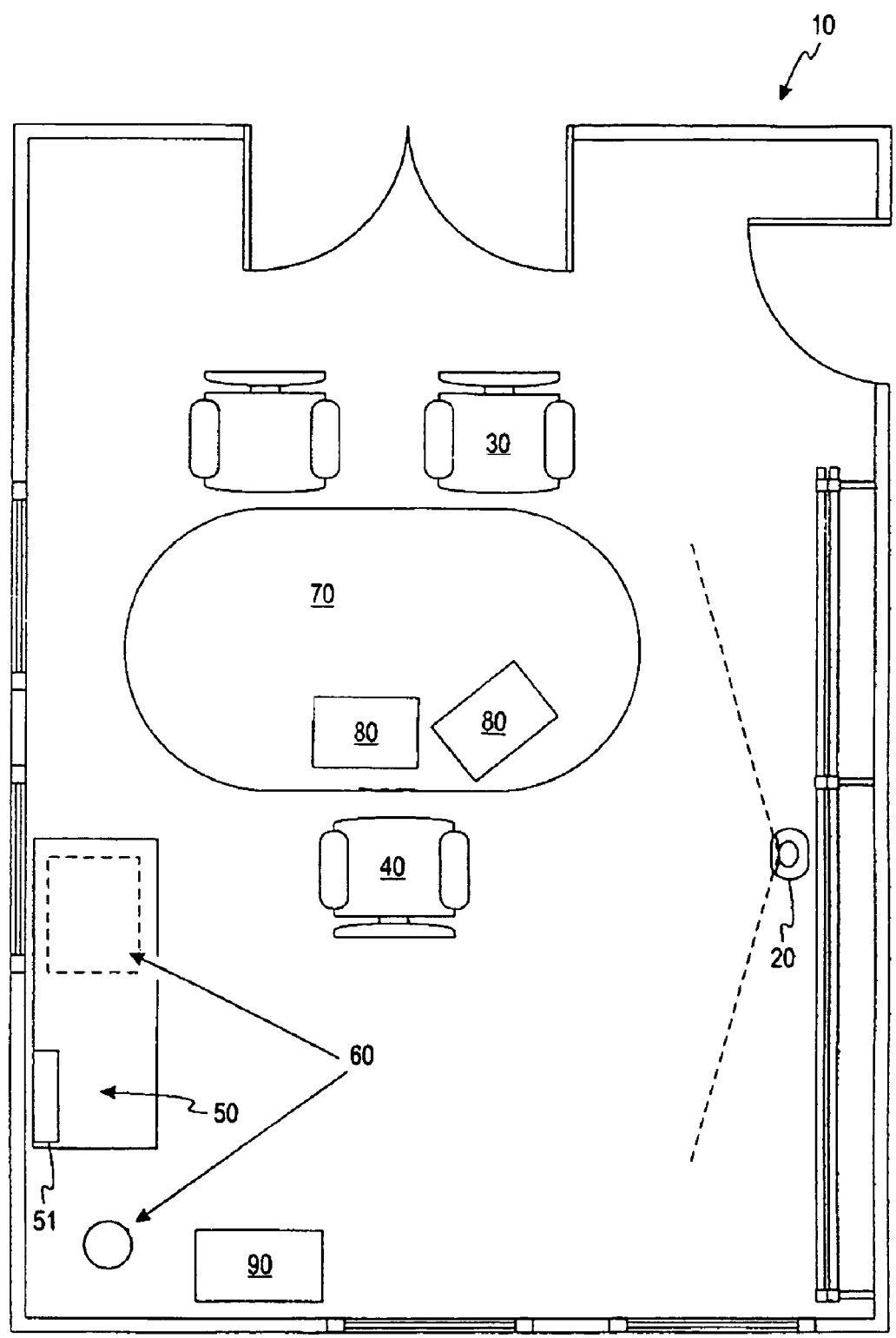
FIG. 1 shows a first example of a telesuite in accord with the present concepts.

FIG. 1 shows one example of a telesuite 10 in accord with the present concepts. In the illustrated example, the telesuite comprises a camera 20 and a plurality of predetermined viewing positions or areas, which may include any combination of a patient viewing area 30, a health care provider or practitioner viewing area 40, a radiograph viewing device area 50 bearing a radiograph viewing device, a physical exhibit viewing device area 60, a desk top area 70, a computer monitor 80, a medical display device or instrument viewing area 90, and/or other designated areas. The predetermined viewing position is defined, for example, by a set of predetermined coordinates in an appropriate coordinate system (e.g., x, y, z or r, θ, α) relative to a selected origin of the camera 20. The camera 20 controller, which includes the motors and mechanisms by which rotational movement of the camera about an axis or axes of rotation is effected, will attempt to position the center of the camera's field of view on this coordinate and focus the lens, if necessary. Once positioned, the camera will include within its field of view a designated area (i.e., a predetermined viewing area) surrounding the predetermined viewing position. The predetermined viewing position may be obtained, for example, by manually positioning the camera 20 to focus on a desired spot so as to encompass the desired field of view and saving the positions of the associated camera driving elements such as, but not limited to, using stepper motor position or motor encoders. The predetermined viewing position may be saved locally, such as in a camera controller (not shown) memory or in a local computer 110 memory.

In one aspect, camera 20 could be disposed outside of and adjacent to telesuite 20, viewing an interior thereof through a transparent substrate such as a glass or plexiglass partition or window or through an opening.

At a minimum, camera 20 is rotatable about at least one axis (e.g., a horizontal axis) and is mounted to a fixed structure such as, but not limited to, a wall, a ceiling, or other appurtenant structure attached thereto. The degree or range of rotation about this axis of rotation should be selected to traverse an arc encompassing desired positions of interest within the originating site (e.g., a telesuite 10, as shown). Preferably, camera 20 is rotatable about at two axes (e.g., a horizontal axis and a vertical axis). Still more preferably, camera 20 is also provided with an optical and/or digital zoom capability (e.g., a 3× digital zoom). In one aspect, the camera may comprise a stereovision camera to permit visual perception in three dimensions.

In one aspect, camera 20 may comprise a model FW-1150 (FlexWATCH™) manufactured by Seyeon Technology, Ltd., of Seoul, Korea. This particular aspect of camera 20 is a stand-alone network camera server with built-in Pan/Tilt/Zoom camera and web server which delivers real-time live video at a rate up to about 30fps over existing telephony systems and networks including, for example, telephone lines, LANs, Cable modems, and xDSL. The FW-1150 camera (e.g., 20) comprises a ⅓" Sony Super HAD CCD® with a 3.8 mm lens with a 3× digital zoom providing resolutions up to about 704×480 (NTSC) or 704×576 (PAL). FW-1150 camera (e.g., 20) is advantageously coupled to a FlexWATCH™ network video server and used in combination with Flex- WATCH™ Voyager Software to enable operation of the camera viewing of multiple angles of a target location (e.g., "originating site") through a standard web browser using any conventional operating system.

Camera 20, as well as its associated software and control systems, may thus conveniently employ "off-the-shelf" components and systems selected for a particular applications and design constraints (e.g., cost, speed, resolution, etc.). In the camera 20 of the present example, a physician in a remote location may use the camera to view, with very high resolution and fidelity, fine details of a radiograph mounted on a radiograph viewing device 51 in the radiograph viewing device area 50 from across the telesuite 10.

It is advantageous to enable operation of the camera 20 only after a potential user has suitably verified authorization to access the camera such as, but not limited to, conventional security devices including password protected server access, IP filtering, and image encryption.

Figure 2:
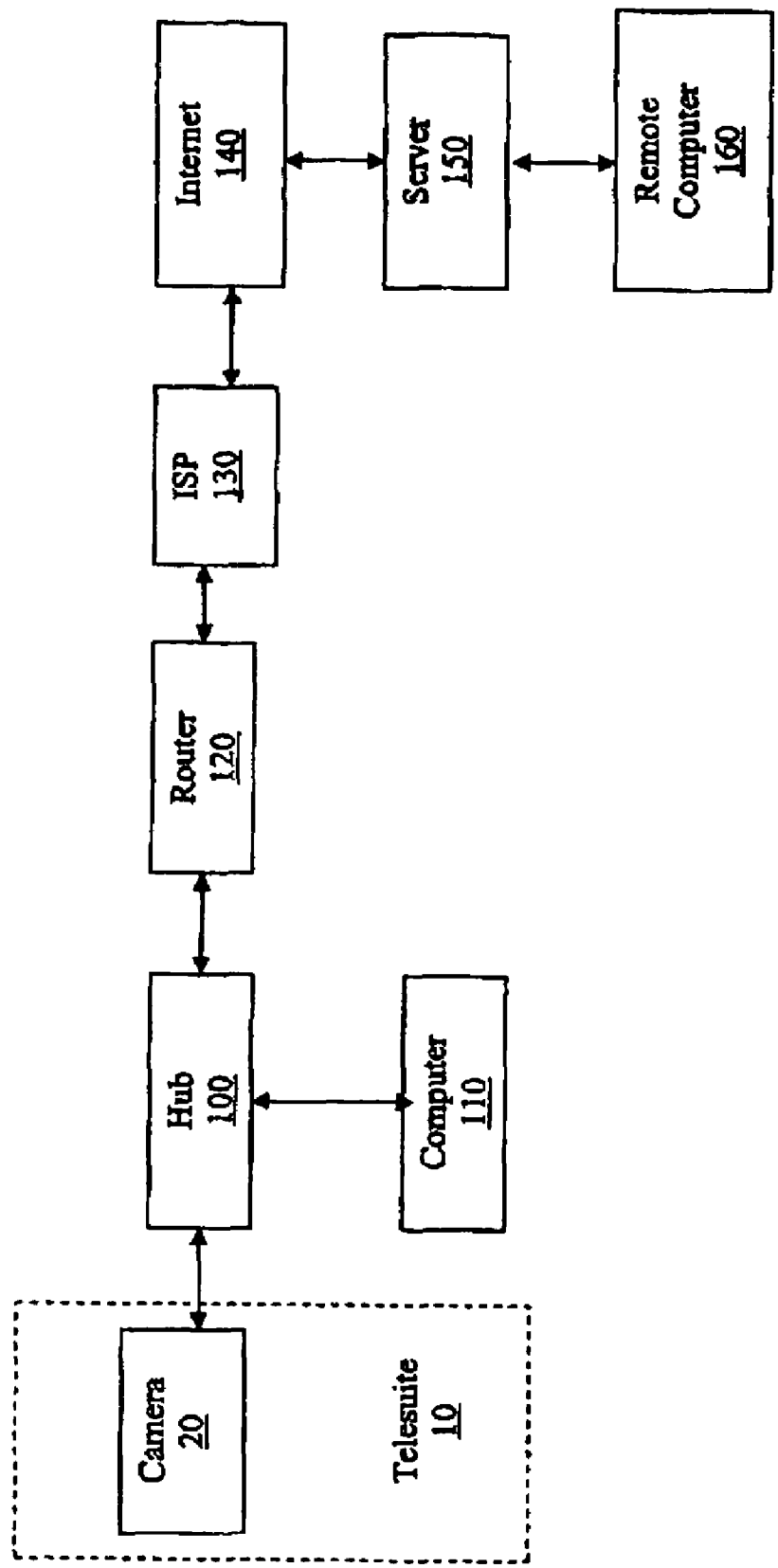
FIG. 2 shows an example of a camera and communications system which may be used in the telesuite of FIG. 1.

FIG. 2 is a block diagram that illustrates one example of a computer and communications system which may be advantageously used in accord with the present concepts. Camera 20 is shown disposed in telesuite 20 and is connected to a hub 100 which serves as the central point of a network and controls the flow of data. A local computer 110 may advantageously be attached thereto. A conventional router 120 is provided to link the local network comprising the camera 20 and hub 102 to another network (e.g., WAN, LAN) or remote computer 160 through an ISP 130 network. In an alternate configuration, a plurality of cameras 20 could be provided within one telesuite 20 or within multiple telesuites 10 and may linked together as a separate LAN network using, for example, a LAN bridge, NTU (network terminal unit), or SDSL bridge or DSL bridge. Access to one or more cameras 20 may also be provided by means of a global static IP address, in which a private IP address may be assigned to a network device in the local network, using a leased line, cable modem and DSL, for example, such that any network device can be accessed from the internet. Other conventional network connections enabling control of camera 20 from a remote computer 160 are also included within the scope of the present concepts.

Where multiple cameras 20 are provided in multiple telesuites 10, whether in a single teleclinic or distributed in different sites, a single doctor or health care provider may be able to simultaneously monitor activities and sessions in such multiple telesuites.

At least one of camera 20 and computer 110 comprise a processor adapted to execute sequences of software instructions contained in a memory thereof. Software instructions may be provided in any number of forms such as source code, assembly code, object code, machine language, compressed or encrypted versions of the foregoing, and any and all equivalents thereof. In alternative embodiments, hard-wired circuitry or firmware may be used in place of or in combination with software instructions and it is to be understood that no specific combination of hardware circuitry, firmware and software are required.

Router 120 includes a communication interface to provide a two-way data communication coupling the network including hub 100 and camera 20 to another network link. The communication interface may be an integrated services digital network (ISDN) card or a modem (e.g., cable/DSL modem) to provide a data communication connection to a corresponding type of communications line or wireless link (e.g., a wireless bridge). In any such implementation, the router 120 sends and receives electrical, electromagnetic or optical signals that carry digital data streams representing various types of information to and from another network, such as equipment operated by an Internet Service Provider (ISP) 130. ISP 130 in turn provides data communication services through the worldwide packet data communication network, now commonly referred to as the "Internet" 140. The signals through the various networks noted above, which carry the digital data to and from computer system 160 and one or both of camera 20 and computer 110, are exemplary forms of carrier waves transporting the information. Remote computer 160 may be located within the same building as camera 20 and/or computer 110 or may be located anywhere else in the world.

The system of FIG. 2 can send and receive messages, signals, and data, including control or instruction signals and program code, through the network(s) connected to router 120. For example, remote computer 160 or server 150 might transmit a requested code for an application program through Internet 140, ISP 130, and router 120 to computer 110. The received code may be executed by a processor (e.g., associated with the camera 20 and/or computer 100) as it is received. In this manner, camera 20 and/or computer 110 may obtain application code or instructions in the form of a carrier wave.

Figure 3:
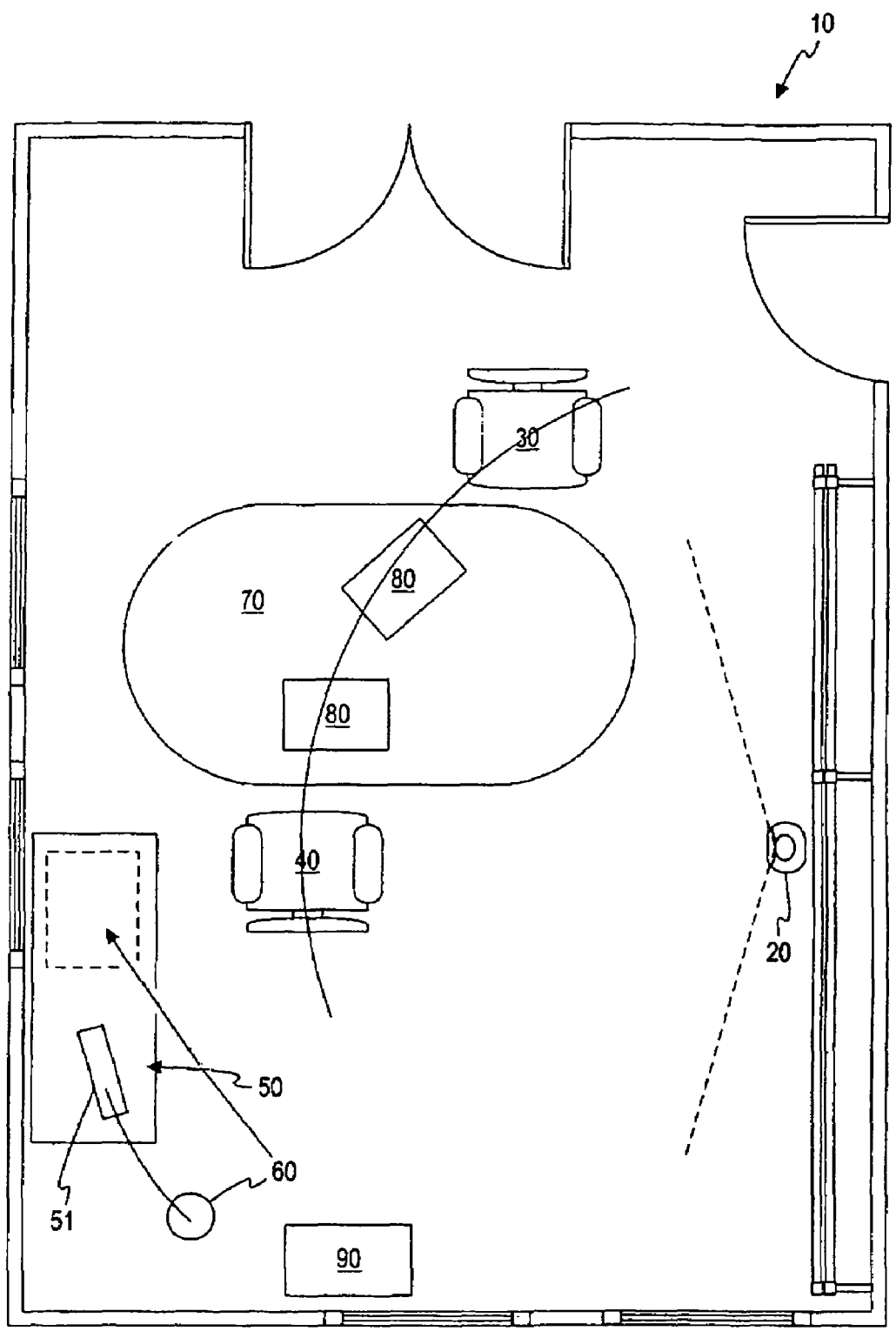
FIG. 3 shows a second example of a telesuite in accord with the present concepts.
Figure 4:
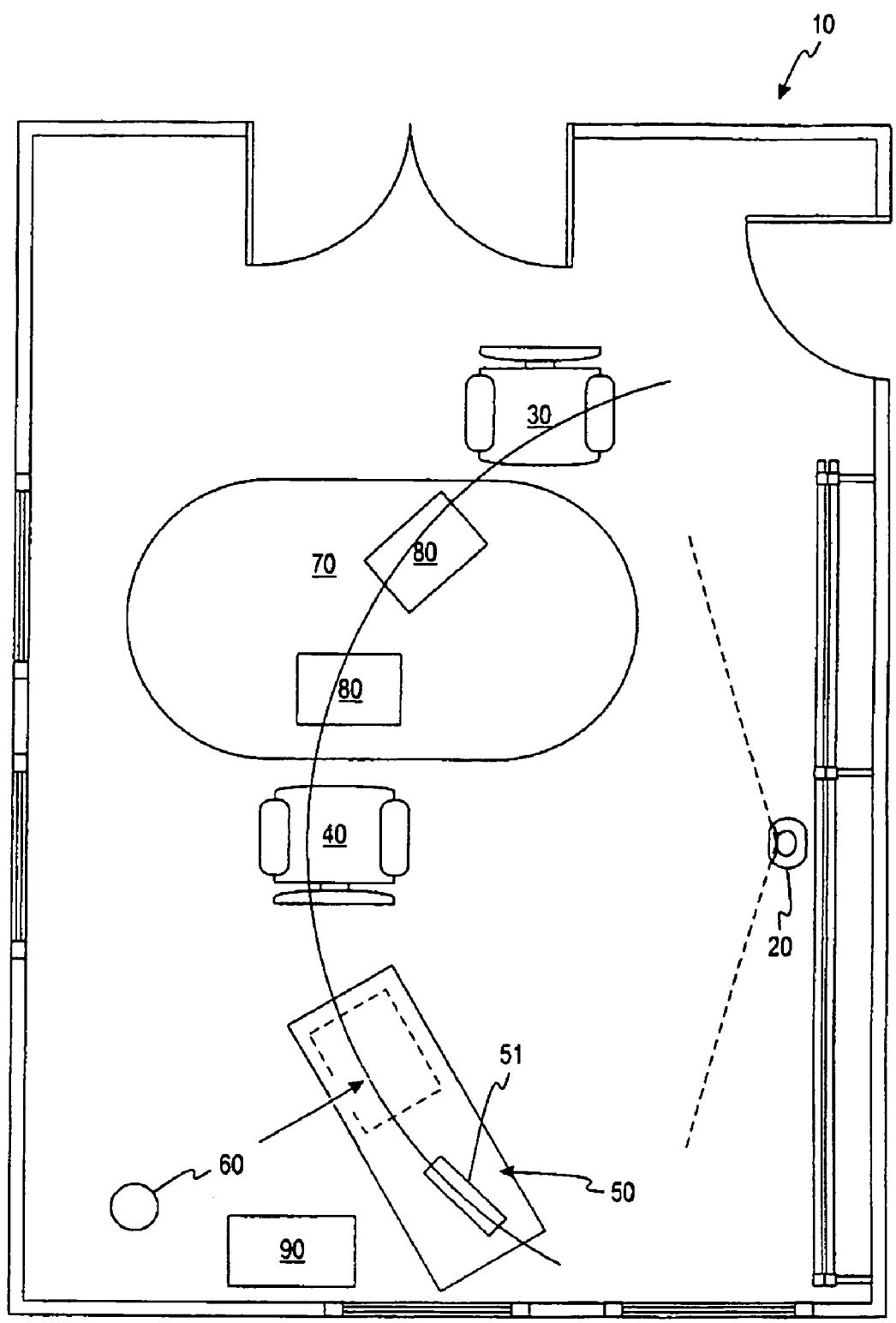
FIG. 4 shows a third example of a telesuite in accord with the present concepts.

Computer 110 may advantageously be connected to one or more local speakers and microphones (not shown), which may be disposed in the local health care provider's office telesuite 10, as shown in FIGS. 1, 3, 4 or in an examination room telesuite, as shown in FIGS. 5(*b*), 5(*c*), to provide 2-way audio capabilities. Additionally, if a conventional camera is operatively associated with or electrically connected to the remote 160 computer, the video signal of the remotely located doctor or health care provider may be transmitted or routed, such as through router 120, hub 100, and/or computer 110, to the computer monitor 80 located in the local health care provider's office telesuite 10, as shown in FIGS. 1, 3, 4 or into a computer monitor located in an examination room telesuite, as shown in FIGS. 5(*b*), 5(*c*), to additionally permit 2-way video communication.

In FIG. 1, the radiograph viewing device area 50 may be designated as a predetermined viewing area. Radiograph viewing device area 50 typically comprises a conventional radiograph viewing device 51, such as a light box, mounted on the wall or to a bracket attached thereto. The radiograph viewing 51 device is usually provided a substantially vertical orientation at approximately eye level (e.g., about 5-5½ feet for a standing viewer or about 3½-4 feet for a sitting viewer). However, as it is becoming increasingly common to digitize radiographs, with or without digital processing, and view them on a high resolution monitor, the radiograph viewing device 51 may also advantageously comprise a high resolution monitor.

The patient viewing area 30 may be designated as another predetermined viewing position or area and, as shown in FIG. 1, may comprise a chair in which the patient is directed to sit. Alternatively, the patient viewing area 30 may comprise a conventional hospital examination table, examination table, ICU Bed, or the like. The patient viewing area 30 may also comprise an area defined by a platform or a taped or painted line or box. Moreover, a plurality of patient viewing areas 30 may be provided within a single telesuite 10 or a plurality of telesuites, as shown in FIG. 3. For example, a first patient viewing area 30 may be provided, as shown, and a second patient viewing area (e.g., a platform) may be provided elsewhere in the telesuite 10 in the event that a patient is required to stand to further the examination or treatment in any respect.

In one aspect, a health care provider or practitioner (e.g., doctor, nurse, physician assistant, therapist, etc.) occupies the predetermined or pre-designated health care provider viewing area 40, shown in FIG. 1 as a chair situated across a desk from the patient viewing area 30. The health care provider viewing area 40 may be disposed anywhere in the telesuite 10, but is generally positioned adjacent the patient to facilitate the physical examination, verbal examination, treatment, and/or therapy. Moreover, a plurality of designated health care provider viewing areas 40 may be advantageously provided in accord with the present concepts. These health care provider viewing areas 40 are generally, but not necessarily, predetermined viewing positions or areas disposed adjacent the patient viewing areas 30.

To facilitate examination and participation by the remote doctor or other health care provider in a second, distal, location (e.g., a "remote site"), one or more physical exhibit viewing device areas 60 may optionally be provided as predetermined viewing positions or areas, such as shown in FIGS. 1, 3 and 4. In a physical exhibit viewing device area 60, any pertinent physical exhibit may be disposed for scrutiny by the remote doctor. In various aspects, the physical exhibit could comprise, for example, a simple skeleton model, a page from a patients chart, a computer screen displaying information, a sample jar, or any other exhibit which might be useful for a particular practice. The size of the physical exhibit viewing device area 60 may vary in accord with the estimated size of any potentially foreseeable physical exhibits and could comprise, for example, an area the size of a Petri dish or the size of a person.

The doctor or health care provider's desk top area 70 may also be selected as a predetermined viewing position or area. This predetermined viewing area is particularly advantageous in situations in which the doctor or health care provider is not sitting in the predetermined health care provider viewing area 40, shown in FIG. 1, but is located at another health care provider viewing area 40 elsewhere in the telesuite 10. In such situation, the doctor or health care provider may request that the remote doctor to take a look at a particular object (e.g., paper) on the desk.

In one advantageous embodiment, a computer monitor 80 disposed in the telesuite 10 (e.g., on the desk top area 70) may be linked to the doctor's or health care provider's personal computer screen or network to allow the doctor or health care provider to pull up a screen of interest (e.g., a digital radiograph, test result, picture, document, etc.) and have the screen of interest simultaneously displayed on the high resolution screen, which may be oriented to maximize presentation to the camera 20. Similarly, a radiograph viewing device area 50 comprising a radiographic viewing device 51 may be provided within a desk top viewing area 70 in an advantageous orientation and position and may be fixedly mounted or rotatably disposed.

Other predetermined viewing position or areas may be selected. For example, to enable a remote doctor to quickly rotate and/or move the camera to view a medical display device or medical instrument of interest, medical display device or medical instrument viewing area(s) 90 may also be provided. As one example, a remote cardiologist might want to observe a patient performing a stress test on a treadmill under the guidance of a technician or physician's assistant to observe the ECG monitor or printout along in a medical display device or instrument viewing area 90. The cardiologist might later "sit in" on the presentation of the results of associated imaging tests (e.g., myocardial perfusion imaging, dual isotope imaging, or positron emission tomography) wherein the results are displayed on a high resolution display 80.

In the above disclosure, a plurality of predetermined viewing positions are available and may include any combination of viewing positions 30-90 or additional positions, such as one or more flat mirrors and/or convex mirrors (not shown) positioned in a designated mirror viewing area to view another area of the telesuite 10 or to view another room, such as an adjacent examination room. The camera 20 will focus on the mirror, not the source of the image the mirror reflects, so clarity is optimized. A convex mirror provides a better field of view, but sacrifices some clarity. Moreover, flat mirrors may be arranged in sequence (e.g., a mirror pointing to another mirror positioned to view a predetermined viewing area) to further expand flexibility of the predetermined viewing area and/or camera 20 positioning. The use of multiple sequentially disposed or independently disposed mirrors could be particularly useful, for example, if a remotely located individual, such as a physician or health care practitioner, wants to be able to obtain multiple views of a single object or of an operation.

In still another configuration, the camera 20 may be mounted on a telescoping or otherwise vertically translating member, such as a drive member attached to a track, able to position a first camera at a range of heights (e.g., between about 1' off of the ground to about 10' off of the ground) to provide additional perspectives for each of the aforementioned predetermined viewing areas. As one example, the telescoping or otherwise vertically translating member may comprise a Televator elevating pedestal (EP-PT-S2), elevating wall mount (EWM-PT-S2), or extendable camera mount (ECM-PT-S2), each manufactured by Telemetrics, Inc. Using this setup, a patient viewing area 30 may be disposed adjacent the vertical space traversed by camera 20 and a remotely located physician or health care provider may vary the height of the camera 20 to view the predetermined viewing area from additional perspectives This is particularly beneficial if the remotely located physician or health care provider wants to closely observe an injury to or lesion on a patient's lower extremities.

In one aspect, each of the selected predetermined viewing positions (e.g., 30-90) has a substantially fixed displacement from the camera. In accord with one aspect of the present concepts, the displacement, from the camera, of a given predetermined viewing position (e.g., patient viewing area 30) may differ from the displacement of another predetermined viewing position (e.g., radiograph viewing device area 50). In accord with another aspect of the present concepts, at least two of the predetermined viewing positions, such as patient viewing area 30 and health care provider viewing area 40 are disposed substantially equidistant from the camera. Other combinations of substantially equidistant predetermined viewing positions could include, but are in no means limited to, a health care practitioner viewing area 40 and a radiograph viewing device area 50, a radiograph viewing device area 50 and a physical exhibit viewing device area 60, a physical exhibit viewing device area 60 and a health care practitioner viewing area 40, or a health care practitioner viewing area 40 and a desk top area 70.

In this aspect, at least two predetermined viewing positions (e.g., 30-90) are disposed to be substantially equidistant from the camera 20, such as along a radial arc path of the camera. The camera controller may move camera 20 of FIG. 3 from pointing to a first predetermined viewing position (e.g., patient viewing area 30) to a second predetermined viewing position (e.g., health care practitioner viewing area 40) upon receipt of a corresponding control signal without the need to re-focus the camera.

In another aspect, represented in FIG. 3, a first grouping of predetermined viewing positions comprises at least two predetermined viewing positions, which may correspond to those described by way of example above, or which may correspond to different predetermined viewing positions. Each of the predetermined viewing positions in the first grouping is disposed substantially equidistant from the camera 20 at a first radius from the camera. A second grouping of predetermined viewing positions comprises at least two other predetermined viewing positions, different from those in the first grouping, disposed substantially equidistant from the camera 20 at a second radius from the camera. In this aspect, it is preferred that the items in each of the groupings are selected so that the general frequency of access is approximately the same. Thus, frequently accessed areas (e.g., 30, 40, 80) might be aligned in a first grouping and less-frequently accessed areas (e.g., 50, 60) might be aligned in a second grouping. In the event that a move from one grouping to another is made, the need for refocusing of the camera 20, with attendant delay, is minimized.

Elimination of the need to re-focus between predetermined viewing positions saves time and provides seamless integration of the viewing positions and eliminates the focusing time and associated annoyance caused thereby, which could be considerable if the camera is required to move back and forth between the predetermined viewing positions frequently. If a remote doctor wishes to more closely examine an object or aspect of one of the predetermined viewing areas, the doctor can use the camera's optional zoom feature to, for example, magnify desired aspects of a radiograph on a radiograph viewing device 51 in a radiograph viewing area 50. The advantages of the present concepts are further accentuated if a high resolution digital zoom camera (e.g., camera 20) is used, rather than an optical zoom camera, as this additionally eliminates the need for movement of physical lens elements within the camera and the associated delays associated therewith, although an optical zoom camera or a camera having both optical and digital zoom capability may be advantageously employed in accord with the present concepts. These benefits are magnified if many predetermined viewing positions are disposed to be substantially equidistant from the camera 20 (e.g., along a radial arc path of the camera), such as shown in FIG. 4.

Delays during the telemedicine session may also be achieved by configuring the camera controller to automatically re-focus the camera 20 during movement (e.g., rotation about an axis or axes of rotation) between a first designated predetermined viewing position and a second designated predetermined viewing position. In this manner, the camera is already at least substantially focused on the second designated predetermined viewing position upon completion of the camera movement.

Figure 5A:
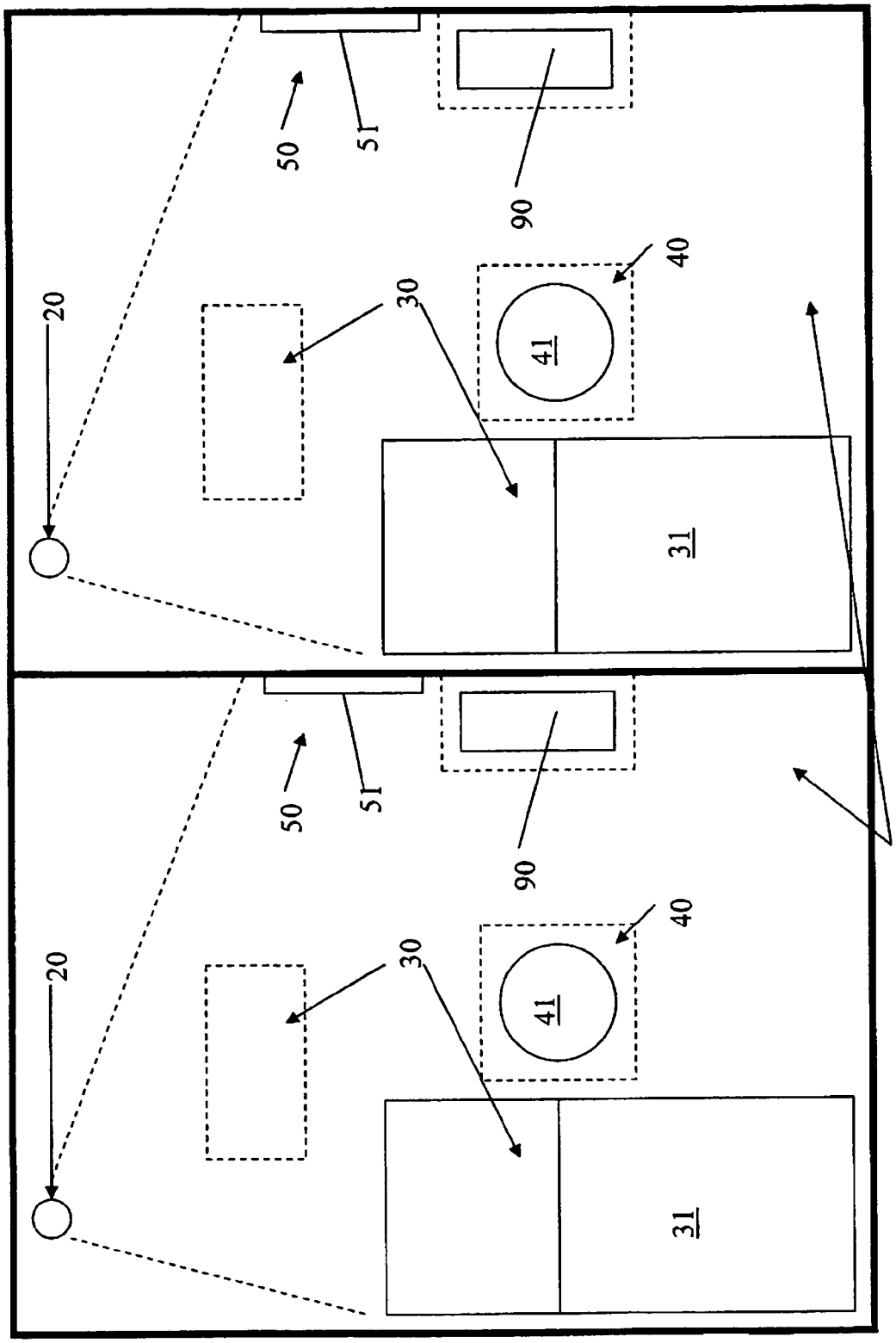
FIGS. 5(a)-5(c) show aspects of fourth, fifth, and sixth examples of telesuites in accord with the present concepts.
Figure 5B:
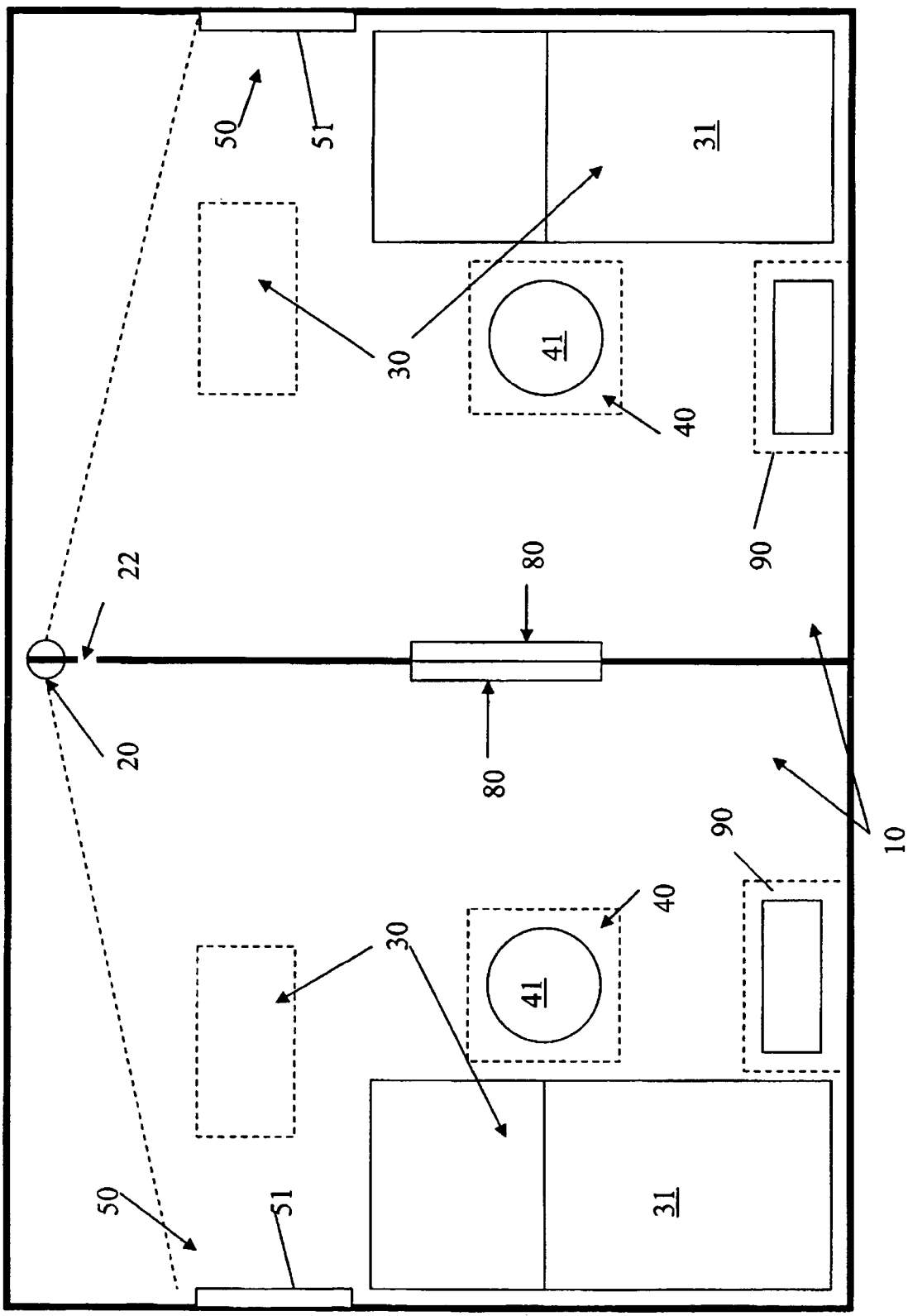
Figure 5C:
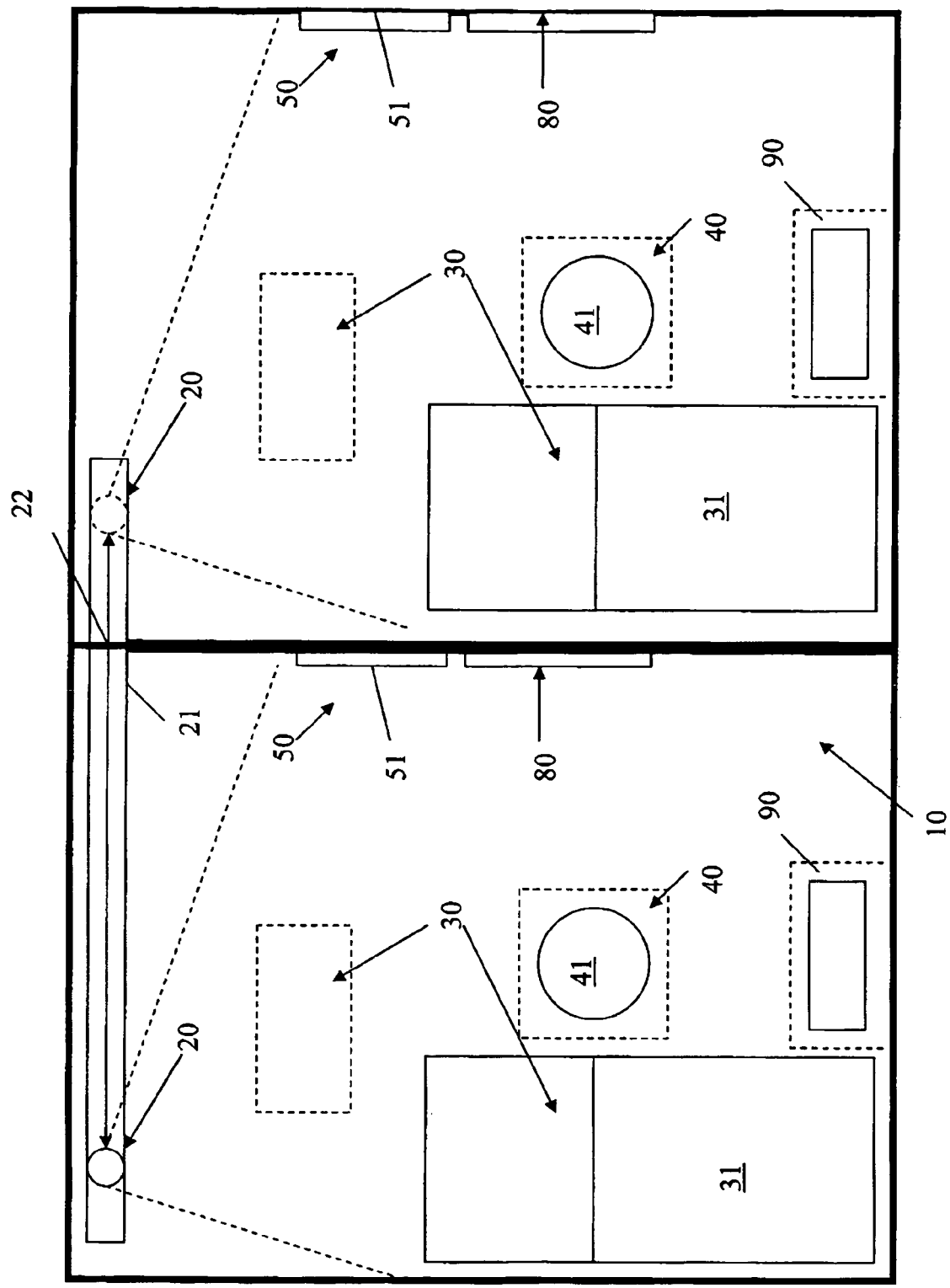

Computer 110 may advantageously be connected to one or more local speakers and microphones (not shown), which may be disposed in the local health care provider's office telesuite 10, as shown in FIGS. 1, 3, 4 or in an examination room telesuite, as shown in FIGS. 5(b), 5(c), discussed below, to provide 2-way audio capabilities. Additionally, if a conventional camera is operatively associated with or electrically connected to the remote 160 computer, the video signal of the remotely located doctor or health care provider may be transmitted or routed, such as through router 120, hub 100, and/or computer 110, to the computer monitor 80 located in the local health care provider's office telesuite 10, as shown in FIGS. 1, 3, 4 or into a computer monitor located in an examination room telesuite, as shown in FIGS. 5(b), 5(c), to permit 2-way video communication.

FIGS. 5(a)-5(c) shows aspects of fourth, fifth and sixth examples of telesuites in accord with the present concepts. Doors and entryways are omitted for clarity, but could be provided in any convenient location. In FIG. 5(a), two separate, substantially standardized adjoining examination room telesuites 10 are shown. Each examination room telesuite 10 has a first patient viewing area 30 including an examination table 31 and a second patient viewing area defined by a platform or a taped or painted line or box on the floor, represented as a dashed line. The health care provider viewing area 40 comprises a typical examination stool 41 disposed within an area of the examination room telesuite 10 designated by a taped or painted line, or the like, represented as a dashed line surrounding the stool. A radiograph viewing device 51 mounted on a wall of the room is provided within a radiograph viewing area 50. A medical display device or medical instrument viewing area(s) 90 is also provided, represented as a dashed line, in which a medical instrument may be provided.

FIG. 5(b) shows another set of examination room telesuites 10, wherein a single camera 20 is positioned to view both rooms. An opening 22 is formed in a top portion of the wall between the telesuites 10 to accommodate the camera 20 in a way that does not obstruct the camera's view of the predetermined viewing areas. To ensure patient privacy and confidentiality, wherein patients or doctors in one examination room telesuite 10 could be heard by patients or doctors in the other examination room telesuite through such opening 22, the camera 20 may be disposed within a transparent material, such as Plexiglass or a glass housing, preferably treated with anti-reflection and other optical coatings to eliminate or mitigate any reflections or other visual artifacts. In FIG. 5(b), examination room telesuites 10 are provided with a computer display or high resolution monitor 80 that is not within any predetermined viewing area. Instead, computer display or high resolution monitor 80 is provided to permit 2-way video communication between the patient and/or local doctor or health care provider with a remotely located doctor or health care provider using computer 160 and an associated camera.

FIG. 5(c) shows still another set of examination room telesuites 10, wherein a single camera 20 is configured to view both rooms. An opening 22 is formed in a top portion of the wall between the telesuites 10 to permit installation of a track 21 between the two telesuites. Camera 20 is mounted on the track 21 and is configured to move laterally along the track between the two examination room telesuites 10. In FIG. 5(c), one potential origin position of the camera 20 in the right telesuite 10 is represented by a dashed circle, this origin position representing substantially the same position relative to the predetermined viewing positions in the other, left examination room telesuite, so as to provide a uniform perspective to the remote doctor or health care provider and to simplify setup of the system. Camera 20 may, however, be positioned at any point along track 21. To minimize sound transmission between the two examination room telesuites 10, a movable door or partition could be provided to substantially cover the opening 22 and could be configured to move, by sliding or rotating, to permit passage of the camera 20 through the opening. In accord with the concept shown in FIG. 5(c), multiple examination room telesuites 10 (e.g., 3, 4, 5 or more) could all be linked together by a single linear or curvilinear (e.g., substantially L-shaped or U-shaped) track 21.

Figure 6:
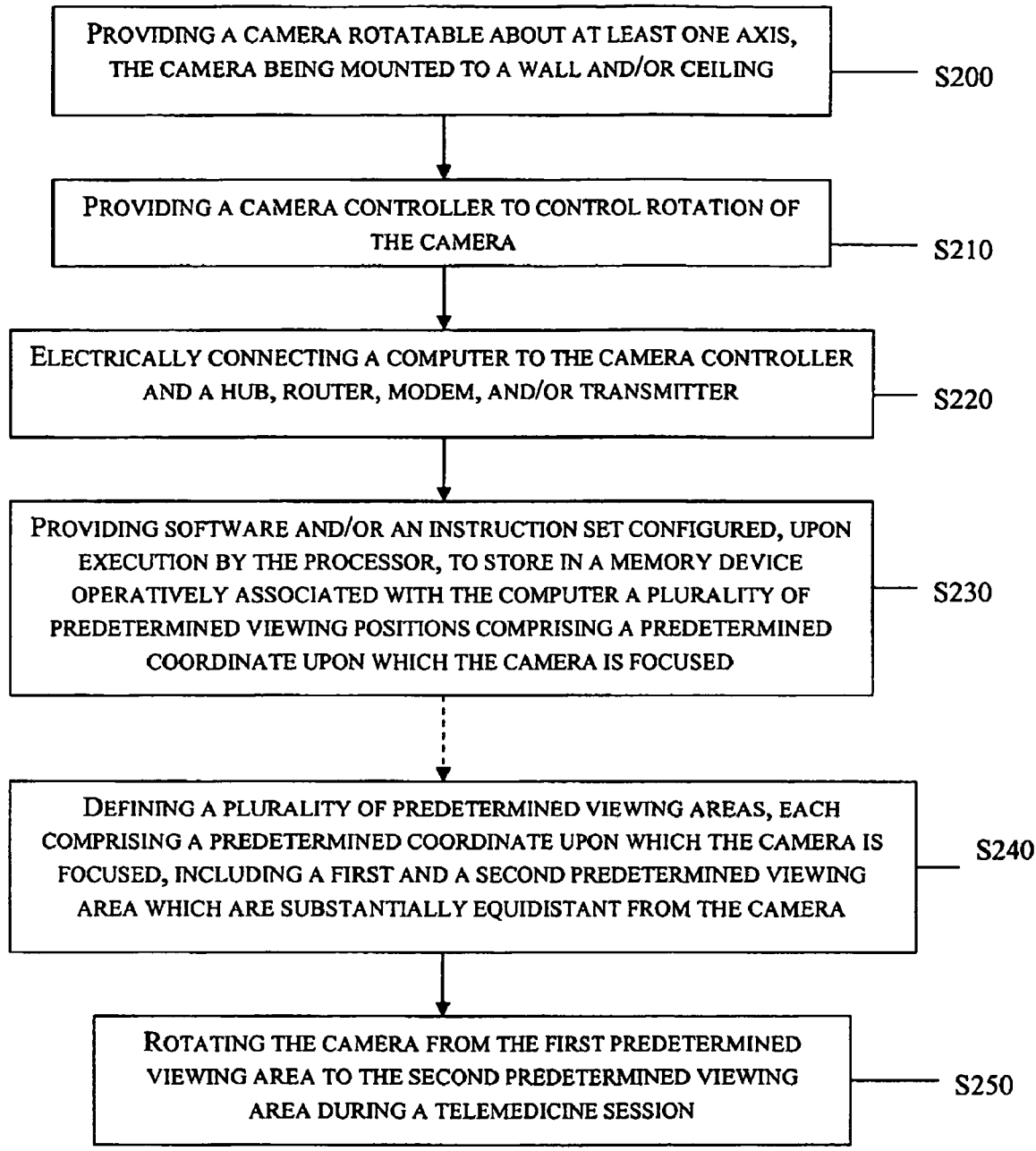
FIG. 6 shows a flowchart of a method in accord with the present concepts.

In accord with the above, and with reference to FIG. 6, a method for arranging a telemedicine suite can be seen to comprise providing a camera rotatable about at least one axis, the camera being mounted to at least one of a wall and a ceiling (S200), providing a camera controller to control rotation of the camera (S210), electrically connecting a computer having a processor to the camera controller and a hub, router, modem, and/or transmitter (S220), and providing software and/or an instruction set configured, upon execution by the processor, to store in a memory device operatively associated with the computer a plurality of predetermined viewing positions comprising a predetermined coordinate upon which the camera is focused (S230).

Once a telesuite is arranged, as noted above, a method for using the telesuite may include the steps of defining a plurality of predetermined viewing areas comprising a predetermined coordinate upon which the camera is focused, the plurality of predetermined viewing areas including a first predetermined viewing area and a second predetermined viewing area which are substantially equidistant from the camera (S240) and rotating the camera from the first predetermined viewing area to the second predetermined viewing area during a telemedicine session (S250). The defining step (S240) includes associating the first predetermined viewing area with one area selected from the group including a patient viewing area, a health care practitioner viewing area, a desk top area, a radiograph viewing device area, a physical exhibit viewing device area, a computer monitor, a television, a medical device display, a medical instrument, and a mirror, and associating said second predetermined viewing area with another member of the group, previously described. These steps are shown in FIG. 6, by the dashed arrow, to be an optional adjunct or follow-on to the method of steps (S200)-(S230).

Figure 7:
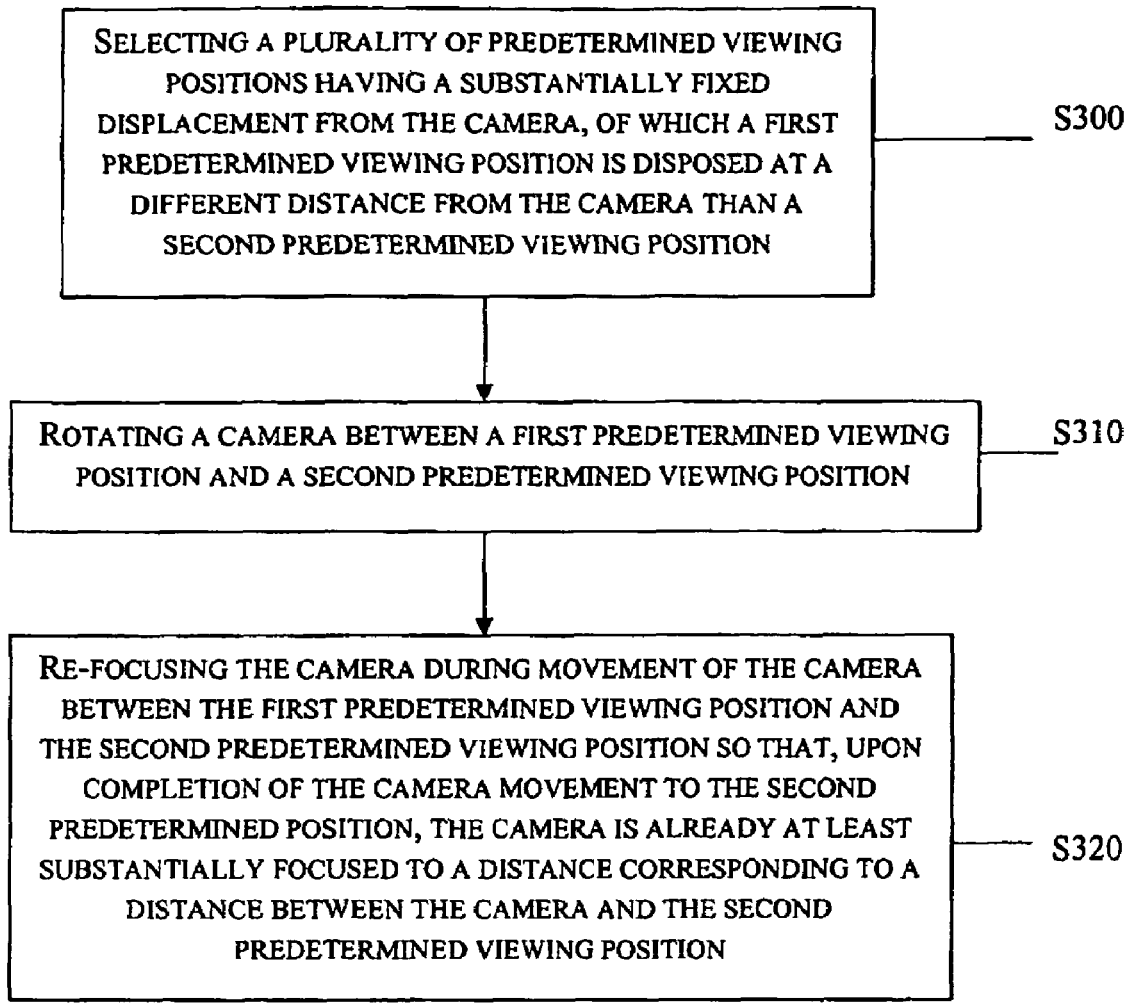
FIG. 7 shows a flowchart of another method in accord with the present concepts.

In accord with FIG. 7, there is provided a method for reducing telemedicine session delays comprising the steps of selecting a plurality of predetermined viewing positions having a substantially fixed displacement from the camera, of which a first predetermined viewing position is disposed at a different distance from the camera than a second predetermined viewing position (S300), rotating a camera between a first predetermined viewing position and a second predetermined viewing position (S310), and re-focusing the camera during movement of the camera between the first predetermined viewing position and the second predetermined viewing position so that, upon completion of the camera movement to the second predetermined position, the camera is already at least substantially focused to a distance corresponding to a distance between the camera and the second predetermined viewing position (S320).

One advantage afforded by the present concepts is that remote doctors using the telesuite 10 may become familiar with the layout, which may be a standardized layout across a plurality of telesuites and teleclinics, and can quickly, and later intuitively and without thought, move between any number of predetermined viewing positions to view desired objects, much as one would be familiar with one's own office and navigate therein. This minimizes delays and improves the efficiency of telemedicine sessions, to further accentuate the efficiency of telemedicine over conventional, often sequential as opposed to simultaneous, office visits.

While the present concepts have been described with reference to one or more particular embodiments, those skilled in the art will recognize that many changes may be made thereto without departing from the spirit and scope of the concepts presented herein. For example, in one aspect, a telesuite 10 staffed by a nurse or physicians assistant may be advantageously provided at manufacturing plants or industrial sites. If a worker suffers a minor injury on the job or has other health related problems, the telesuite can serve as an initial triage site wherein a remote on-call general practitioner, or any one of a plurality of on-call specialists, can immediately and efficiently provide assistance and guidance. For minor health related issues, an on-call general practitioner could, following a preliminary evaluation of the patient, provide a recommendation to see a specialist (who then might be subsequently "brought into" the telesuite 10. Such on-site "visits" could take place in a matter of minutes, particularly if a variety of specialists are also available on-call (e.g., in a queue) to participate in such telemedicine sessions. Whereas, conventionally, a person would simply declare a sick day and go home and possibly incur additional sick days off in subsequent follow-up doctor's appointments, on-site telemedicine has the ability to reduce workplace absenteeism arising from general health related issues and to improve the standard of care of injured employees.

The telesuite 10 can also be used in other consultative capacities. For example, a patient can obtain a consultation with the physician or health care practitioner even when the patient is remotely located and cannot visit the doctor or health care practitioner. The patient may still communicate with the doctor via 2-way audio and the patient can see the doctor or health care practitioner. This might allow the doctor or health care practitioner to demonstrate some principle, procedure, exercise, exhibit, test result, etcetera, which may be difficult to communicate using only verbal, non-visual communication.

The above concepts may be extended to use by design teams to "send" blueprints from one location to another, such as by printing blue prints on transparency paper and putting them on a conventional light box 51 for added contrast, for simultaneous viewing and discussion. This embodiment would also lend itself to other professionals, such as patent attorneys, engineers, draftspersons, so they can remotely discuss detailed drawings in real time rather than discussing PDF files. Moreover, the above disclosure applies equally to videoconference rooms, methods for using video-conferencing rooms, and methods for reducing video-conference session delays, and may be configured and used for such purpose.

Figure 8:
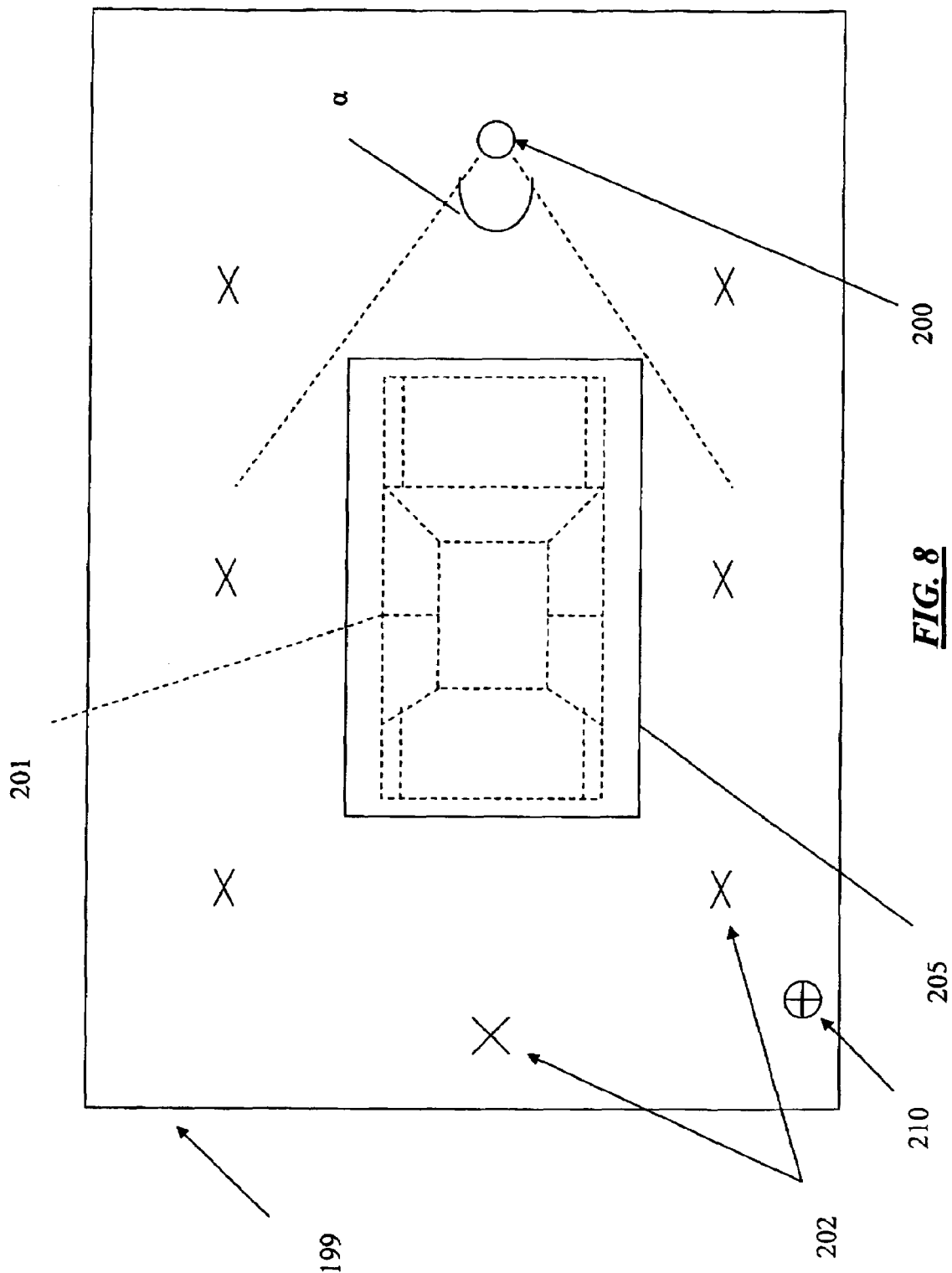
FIG. 8 shows a first example of a vehicle showroom in accord with the present concepts.

FIG. 8 shows a first example of a vehicle showroom 199 in accord with various other aspects of the present concepts. In many dealer to dealer auctions or high-end person to person automobile sales involving unique, expensive, or hard-to-find used cars, dealers, brokers, and potential buyers are often left in the quandary of having to pay a great deal of money to travel to a distant location to examine the car, having to trust a third party's or even the negotiating party's assessment of the car's condition, or having to cover the costs of transportation of the car to a local site for viewing. Often, the only information on the condition of a vehicle that is readily available are textual printouts with perhaps photographs of the vehicle. Each of these options involves an undesirable expenditure, effort, or risk. The present concepts are easily extendable to fill this need.

Figure 9:
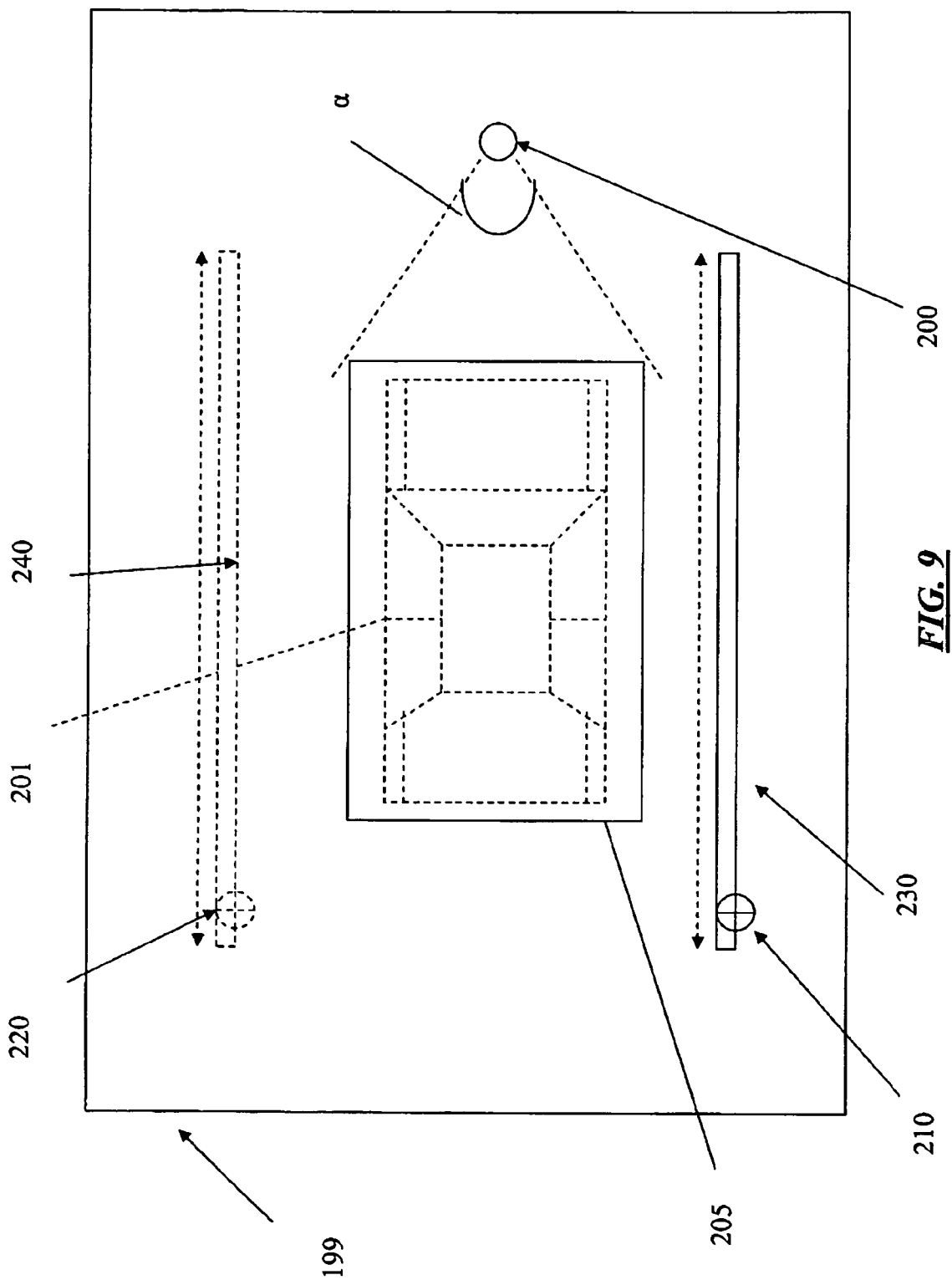
FIG. 9 shows a second example of a vehicle showroom in accord with the present concepts.
Figure 10:
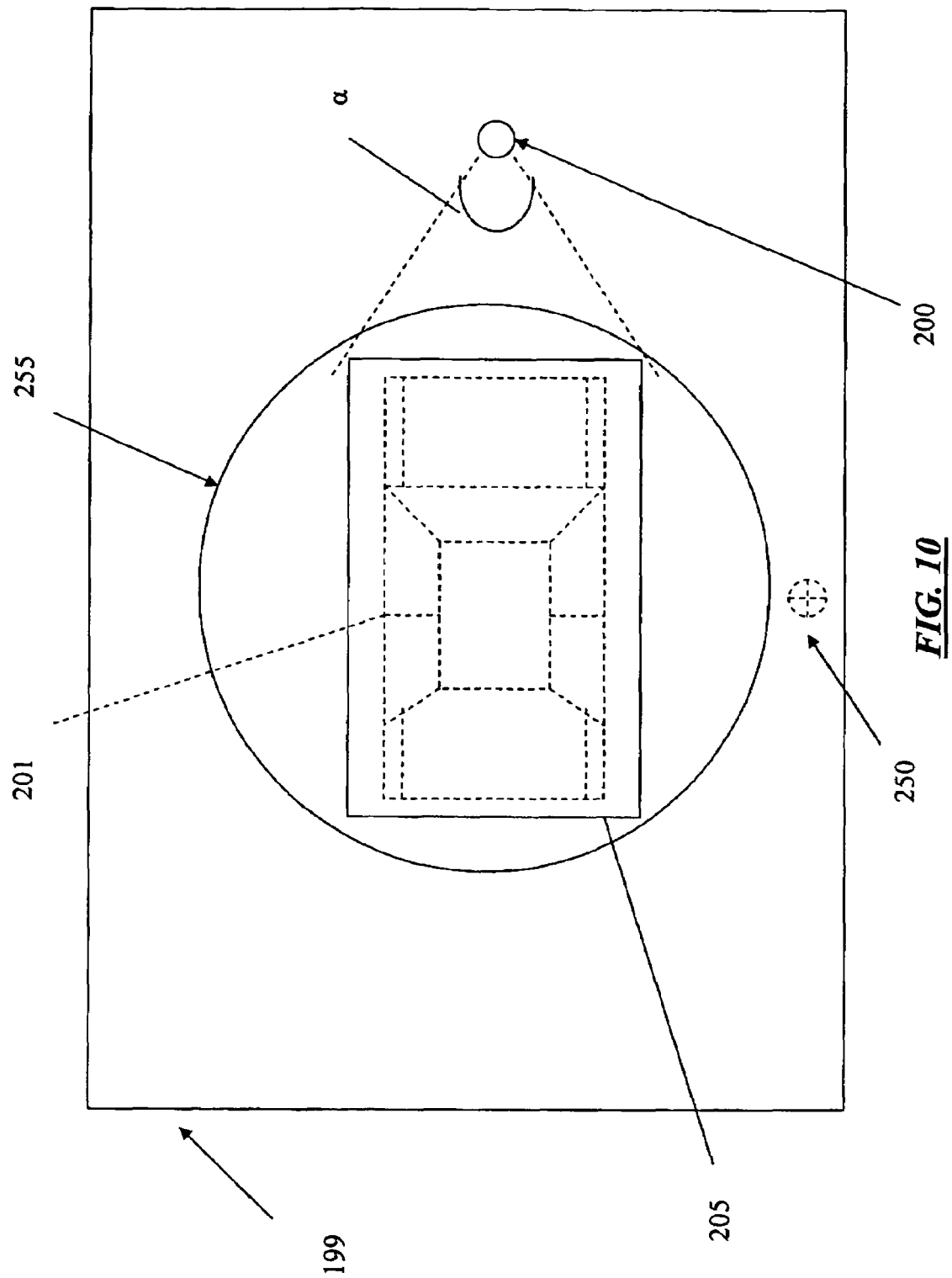
FIG. 10 shows a third example of a vehicle showroom in accord with the present concepts.

In accord with FIGS. 8-10, there are provided at least one vehicle showroom or viewing bay 199 wherein a vehicle of interest may be positioned at a prearranged time, such as by agreement between one potential buyer and one potential seller, or broker therefor. In this aspect, a first pan/tilt/zoom camera 200 may be advantageously mounted on a ceiling or a wall in front of and centered with respect to a vehicle parking area 205, a designated area where a vehicle 201 is to be parked during the inspection. First camera 200 is configured to cover a viewing angle α inclusive of the vehicle parking area 205.

A second camera 210, preferably but not necessarily a pan/tilt/zoom camera, is mounted on a portable stand, optionally a wheeled stand having a height adjustable member to which the camera may be attached, movable to any one of a plurality of predetermined viewing positions 202 arranged adjacent the vehicle parking area 205. The second camera 210 may be linked via a wireless connection or by a video cord or cable to an associated receiver or connection, such as a CAT 5 wall jack. Power for the second camera may be provided by a local battery, which may be disposed on or in the portable stand, or by a conventional power cord. Each of the predetermined viewing positions 202 in the example of FIG. 8 are shown as an "X." For each of these predetermined viewing positions, a plurality of separate heights may also be dictated (1', 2', 4', 6', etc.). The second camera may view substantially the entire vehicle using second camera 210. The broker or salesman just has to wheel the stand bearing the second camera 210 to the right spots. To facilitate reproducibility of stand placement, pre-designated spots or markings on the floor can be used as reference markers for the stand. Alternatively, small mounts or structures advantageously adapted to suit a particular stand configuration, such as but not limited to angle jigs, may be attached to the floor so the stand fits into or abuts against the mount for alignment and/or stabilization. The pre-designated viewing areas 202 or coordinates can then be set from these reference points.

In one aspect, the buyer, dealer, or broker interested in purchasing the vehicle may log into their computer at their own home or office, log into a pre-designated website, and gain control of the first camera 200 and, optionally, any associated cameras. In another aspect, if a plurality of potential buyers, dealers, or brokers are interested in purchasing the vehicle, the showing could be less individualized and may follow a predetermined sequence or script that will leave no portion of the vehicle unviewed. In such arrangement, serious buyers may arrange for an optional subsequent, personal viewing while the vehicle is in the vehicle parking area 205.

In the example of FIG. 9, the first camera 200 remains as before. However, the second camera 210 is mounted on a track 220, which may be linear or curvilinear. As with the example of FIG. 8, the second camera 210 is movable, as indicated by the dashed arrow, to any one of a plurality of viewing positions arranged on the track adjacent the vehicle parking area 205. A third camera 230 may be similarly situated on another linear or curvilinear track 240 disposed on an opposite side of the vehicle parking area 205. The second and third cameras 210, 230 may be moved along track(s) 220, 240 using any conventional drive means appropriate for a selected linear or curvilinear track. Thus, prospective buyers may view both sides of the car simultaneously on a split screen.

Although this embodiment lends itself to situations wherein predetermined viewing positions along the track(s) 220, 240 are useful, this embodiment is also able to advantageously translate from a first position relative to the vehicle parking area 205 (e.g., a rear thereof) to a second position relative to the vehicle parking area (e.g., a front thereof) along the track(s) 220, 240, thereby providing a video feed continuously as the second and/or third cameras 210, 230 move along the track(s) 220, 240, preferably at a constant and slow rate of speed. This type of viewing is particularly useful to view the exterior of the vehicle. In one aspect, the speed at which the camera(s) 210, 230 move along the track(s) 220, 240 would be between about 1-4 inches per second, depending on the condition of the vehicle, number of potential viewers/buyers, and seriousness of the viewers/buyers. A speed of about 2 inches per second will, for a Ferrari 612 Scaglietti having a length of 193.0 inches, takes about 97 seconds or about 1.5 minutes for one side of the vehicle. In such a view of the vehicle exterior, the second and third camera(s) 210, 230 are preferably aligned to be substantially perpendicular to the vehicle. To view a vehicle interior, the second and/or third cameras 210, 230 may be positioned at any appropriate viewing position and the doors and/or windows of the vehicle opened. A selected camera may then be positioned along the respective track 220, 240 and the camera rotated to obtain a desired view.

In still another aspect, shown in FIG. 10, the first camera 200 remains as before. An optional second camera 250 may be provided at a different elevation than the first camera. In FIG. 10, vehicle parking area 205 is a conventional vehicle turntable 255, or any other suitable turntable, to rotate the vehicle through a predetermined range of rotation (e.g., 30°, 45°, 60°, 90°, 180°, 360°). In one aspect, the vehicle turntable can include a CarTurn 14' diameter turntable manufactured by CarTurn, Inc. of Aston, Pa., which is able to rotate a vehicle through 180° in about 15 seconds. The 14' turntable 255 may accommodate larger vehicles having a wheel base of up to about 123". Another conventional turntable includes, but is by no means limited to, those manufactured by Hovair Systems Incorporated of Seattle, Wash.

Camera 250 may be a pan/tilt/zoom camera fixed in position, as shown, offset from the first camera 200. The offset is generally 90°, but could be varied as desired. In one configuration, the vehicle positioned in the vehicle parking area 205 may be rotated through a predetermined angle using the turntable 255 (e.g., 180°), and the first camera 200 and second camera 250 used to view the vehicle from alternate points of view.

In still another configuration, the first camera 200 may be mounted on a telescoping or otherwise vertically translating member, such as a drive member attached to a track, able to position the first camera at a range of heights (e.g., between 1' off of the ground to 10' or 15' off of the ground) so that, in combination with the vehicle turntable 255, only a single camera is required to view any aspect of the vehicle in the vehicle parking area 205.

As with the telesuite 10 examples, one or more mirrors (i.e., flat mirrors and/or convex mirrors) (not shown) could be positioned in one or more designated mirror viewing areas to view portions of a vehicle 201 not able to be directly viewed from a particular location of a first camera (e.g., 200) or second camera (e.g., 210). For example, a long mirror could be provided in the location occupied by the optional track 230 in FIG. 9 and the camera 210 could be elevated to view the opposite side of the car using the mirror. Alternately, multiple mirrors could be provided in or near the location occupied by the optional track 230 in FIG. 9 in a placement permitting the camera 210 to view the opposite side of the car by viewing the reflection of the vehicle using multiple mirrors. One or more mirrors may also be arranged to permit the cameras (e.g., 200, 210) to view the underside of the vehicle 201. Additional lighting advantageously illuminates the underside of the vehicle.

Although the vehicle inspection bay shown by way of example in FIGS. 8-10 may be used commercially for business-to-business dealings, they may also be leased to the general public for personal use, for a fee, such as but not limited to a predetermined flat fee, a value-based-fee based on the value of the vehicle, a usage-based fee directly related to the time that the system is used, or a demand-based fee which would be less expensive for off-peak usage. The disclosed vehicle inspection bay may also be provided as a stand alone business particularly catering to person-to-person vehicle sales. A person selling a vehicle may arrange a suitable time for a "live" viewing of his or her vehicle, or they may simply "record" a general viewing of the vehicle for later viewing by a prospective buyer and provide the option of a "live" viewing at a later time for serious inquiries. Like conventional advertisements, a recorded general viewing may be made available for a desired time period for a corresponding fee, after which time the recording expires and is deleted from the system or is retained, but rendered inaccessible, for a specified period (e.g., a week, two weeks, a month, etc.) to permit the seller to renew the advertisement.

In each of the above embodiments, the video signals from the cameras 20, 200, 220 are transmitted from the cameras to a hub 100 by means of conventional video cables (e.g., twisted pair wire, fiber optic transmission equipment) or wireless communications devices, wherein the signals may be passed or transmitted to a computer 110, a router 120, or a transmitter (not shown) for transmission to a remote computer (e.g., 160) using an appropriate communication medium (e.g., internet 140 or satellite link (not shown)).

Moreover, it is to be understood that the concepts represented in FIGS. 8-10 could be applied to other high value goods or varying sizes, such as gems or jewelry, where a potential buy could view a gem on a turntable (in one screen view) and may view a GIA appraisal of the gem in another screen view. The concepts could also be extended to auctions and auction houses, wherein many potential bidders are located remotely. An auction house can prepare recorded video sessions of the object to be auctioned, whether a piece of art, a watch, or a vintage automobile, on a turntable. Serious inquiries may be invited for an additional "live" viewing prior to or during bidding.

Each of these embodiments and obvious variations thereof is contemplated as falling within the spirit and scope of the disclosure, set forth in the following claims. Various additional aspects of the present concepts are outlined below by way of example. The appended claims reflect certain aspects and combinations of the present concepts, but are not exhaustive of all such aspects and combinations and the present concepts include all possible logical combinations of the claims and of the various claim elements appended hereto, without limitation, within the associated claim sets regardless of the presently indicated dependency.

In one aspect, a telesuite comprises a camera rotatable about at least one axis and translatable along at least one of a substantially horizontal and a substantially vertical direction from a first origin position to a second origin position. A plurality of predetermined viewing positions are provided, each of the predetermined viewing positions comprising a predetermined coordinate relative to at least one of the first origin position and second origin position upon which the camera is focused. The telesuite also comprises a camera controller configured to cause the camera to perform at least one of a translation to a designated one of the first and second origin positions and a rotation to point the camera at a selected one of the plurality of predetermined viewing positions upon receipt of a corresponding control signal. In this aspect, the plurality of predetermined viewing positions comprising at least two predetermined viewing positions selected from the group consisting of a patient viewing area, a health care practitioner viewing area, a desk top area, a radiograph viewing device area, a physical exhibit viewing device area, a computer monitor, a television, a medical device display, and a medical instrument. Further, at least two predetermined viewing positions are disposed substantially equidistant from the camera along a radial arc path of the camera.

In another aspect, a telesuite comprises a camera rotatable about at least one axis, the camera being mounted to a fixed structure. A plurality of predetermined viewing positions are provided, each of the predetermined viewing positions comprising a predetermined coordinate upon which the camera is focused. A camera controller is also provided and is configured to rotate the camera to a designated one of the predetermined viewing positions upon receipt of a control signal corresponding to the designated one of the predetermined viewing positions. A first grouping of the plurality of predetermined viewing positions comprises at least a first predetermined viewing position and a second predetermined viewing position disposed substantially equidistant from the camera at a first radius from the camera. A second grouping of the plurality of predetermined viewing positions comprises at least a third predetermined viewing position and a fourth predetermined viewing position disposed substantially equidistant from the camera at a second radius from the camera.

In still another aspect, a telesuite comprises a camera rotatable about at least one axis, a plurality of predetermined viewing positions, each of the predetermined viewing positions comprising a predetermined coordinate upon which the camera is focused, and a camera controller configured to rotate the camera to a designated one of the predetermined viewing positions upon receipt of a corresponding control signal. In this aspect, the camera controller is configured to automatically re-focus the camera during movement between a first predetermined viewing position and a second predetermined viewing position so that, upon completion of the camera movement, the camera is already at least substantially focused at a distance corresponding to a distance of the second predetermined viewing position from the camera. In accord with this aspect, the movable camera may optionally be mounted to a fixed structure. Further, in accord with this aspect, the plurality of predetermined viewing positions may optionally comprise at least two predetermined viewing positions selected from the group consisting of a patient viewing area, a health care practitioner viewing area, a desk top area, a radiograph viewing device area, a physical exhibit viewing device area, a computer monitor, a television, a medical device display, a medical instrument, and a mirror, wherein each of the predetermined viewing positions having a substantially fixed displacement from the camera.

A telemedicine suite may also comprise a camera rotatable about at least one axis, the camera being rotatably mounted to a fixed structure, a plurality of predetermined viewing areas inclusive of a first predetermined viewing area and a second predetermined viewing area which are substantially equidistant from the camera, each of the predetermined viewing areas comprising a predetermined coordinate upon which the camera is focused, and a camera controller configured to rotate the camera to view a designated one of predetermined viewing areas upon receipt of a control signal corresponding to the designated one of predetermined viewing areas, a method is provided for reducing telemedicine session delays comprising the step of rotating the camera between a first predetermined viewing area and a second predetermined viewing area during a telemedicine session.

A method is also provided for using a telemedicine suite comprising a camera fixed in a predetermined location and rotatable about at least one axis. This method comprises defining a plurality of predetermined viewing areas comprising a predetermined coordinate upon which the camera is focused, the plurality of predetermined viewing areas including a first predetermined viewing area and a second predetermined viewing area which are substantially equidistant from the camera. This method also includes rotating the camera from the first predetermined viewing area to the second predetermined viewing area during a telemedicine session. The defining step includes associating the first predetermined viewing area with an area selected from a group consisting of a patient viewing area, a health care practitioner viewing area, a desk top area, a radiograph viewing device area, a physical exhibit viewing device area, a computer monitor, a television, a medical device display, a medical instrument, and a mirror, and associating the second predetermined viewing area with another group member.

Further, a method for reducing telemedicine session delays is provided which comprises selecting a plurality of predetermined viewing positions having a substantially fixed displacement from the camera, of which a first predetermined viewing position is disposed at a different distance from the camera than a second predetermined viewing position, rotating a camera between a first predetermined viewing position and a second predetermined viewing position, and re-focusing the camera during movement of the camera between the first predetermined viewing position and the second predetermined viewing position so that, upon completion of the camera movement to the second predetermined position, the camera is already at least substantially focused to a distance corresponding to a distance between the camera and the second predetermined viewing position. This method may also optionally comprise mounting the movable camera to a fixed structure. In other aspects, the camera may optionally rotate about at least two axes comprising a substantially horizontal axis and a substantially vertical axis. In such aspect, the first predetermined viewing position may be selected from the group consisting of a patient viewing area, a health care practitioner viewing area, a desk top area, a radiograph viewing device area, a physical exhibit viewing device area, a computer monitor, a television, a medical device display, a medical instrument, and a mirror. A second predetermined viewing position may be selected from another one of the group consisting of a patient viewing area, a health care practitioner viewing area, a desk top area, a radiograph viewing device area, a physical exhibit viewing device area, a computer monitor, a television, a medical device display, a medical instrument, and a mirror.

In further aspects of the present concepts, a virtual vehicle showroom is provided comprising at least one vehicle viewing bay including a vehicle parking area, a first camera positioned in a first location relative to the vehicle parking area, and a first camera controller configured to perform at least one of a pan movement, rotational movement, or zoom of the first camera. This virtual vehicle showroom further comprises a movable second camera movable to any one of a plurality of predetermined viewing positions and viewing heights arranged adjacent the vehicle parking area and a second camera controller configured to perform at least one of a pan movement, rotational movement, or zoom of the second camera. A communications hub is also provided for receiving and transmitting or passing the signals from the first and second cameras to at least one of a computer, a router, and a transmitter for transmission to a remote computer using a communication medium. In this virtual vehicle showroom, the second camera may optionally be disposed within a track and configured for motion along the track. A movable third camera movable to any one of a plurality of predetermined viewing positions and viewing heights arranged adjacent the vehicle parking area may also optionally be provided. Such third camera may be disposed within another track and configured for motion along the another track.

Another aspect of the virtual vehicle showroom may comprise at least one vehicle viewing bay including a vehicle turntable, the vehicle turntable comprising a vehicle parking area, a first camera positioned in a first location relative to the vehicle parking area, and a first camera controller configured to perform at least one of a pan movement, rotational movement, or zoom of the first camera. A movable second camera is also provided and is movable to any one of a plurality of predetermined viewing positions and viewing heights arranged adjacent the vehicle parking area. A second camera controller is configured to perform at least one of a pan movement, rotational movement, or zoom of the second camera. A communications hub for receiving and transmitting or passing the signals from the first and second cameras to at least one of a computer, a router, and a transmitter for transmission to a remote computer using a communication medium.

Still another aspect of a virtual vehicle showroom comprises at least one vehicle viewing bay including a vehicle turntable, the vehicle turntable comprising a vehicle parking area, a vertically translatable stand disposed adjacent the vehicle parking area, the vertically translatable stand being mounted to at least one of a floor, a wall, and a ceiling. A first camera is mounted to the vertically translatable stand and a communications hub is provided for receiving and transmitting or passing the signals from at least the first camera to at least one of a computer, a router, and a transmitter for transmission to a remote computer using a communication medium. In this aspect, a second camera may optionally be disposed in a position different from that of the first camera. The vertically translatable stand may be configurable, for example, to position the first camera at a range of heights between about 1-15 feet off of the ground.

What is claimed is:

1. A telesuite comprising:
   a camera rotatable about at least one axis, said camera being rotatably mounted to a fixed structure;
   a plurality of predetermined viewing positions, each of said predetermined viewing positions comprising a predetermined coordinate upon which the camera is focused; and
   a camera controller configured to rotate said camera to view a designated one of the predetermined viewing positions upon receipt of a control signal corresponding to the designated one of the predetermined viewing positions,
   wherein said camera is rotatable about at least two axes,
   wherein said at least two axes comprise a substantially horizontal axis and a substantially vertical axis, and
   wherein one of said plurality of predetermined viewing positions comprises a patient viewing area.

2. A telesuite accordingly to claim 1, wherein one of said plurality of predetermined viewing positions comprises a health care practitioner viewing area.

3. A telesuite accordingly to claim 1, wherein one of said plurality of predetermined viewing positions comprises a radiograph viewing device area.

4. A telesuite accordingly to claim 1, wherein one of said plurality of predetermined viewing positions comprises a physical exhibit viewing device area.

5. A telesuite accordingly to claim 1, wherein one of said plurality of predetermined viewing positions comprises a desk top area.

6. A telesuite accordingly to claim 1, wherein one of said plurality of predetermined viewing positions comprises at least one of a computer monitor, a television, a medical device display, a medical instrument, and a mirror.

7. A telesuite comprising:
   a camera rotatable about at least one axis, said camera being rotatably mounted to a fixed structure;
   a plurality of predetermined viewing positions, each of said predetermined viewing positions comprising a predetermined coordinate upon which the camera is focused; and
   a camera controller configured to rotate said camera to a designated one of the predetermined viewing positions upon receipt of a control signal corresponding to the designated one of the predetermined viewing positions, wherein at least two of the plurality of predetermined viewing positions are disposed substantially equidistant from the camera, wherein said camera is rotatable about at least two axes, wherein said at least two axes comprise a substantially horizontal axis and a substantially vertical axis, and wherein said at least two of the plurality of predetermined viewing positions disposed substantially equidistant from the camera comprise a patient viewing area and a health care practitioner viewing area.

8. A telesuite accordingly to claim 7, wherein said at least two of the plurality of predetermined viewing positions disposed substantially equidistant from the camera comprise a health care practitioner viewing area and a radiograph viewing device area.

9. A telesuite accordingly to claim 7, wherein said at least two of the plurality of predetermined viewing positions disposed substantially equidistant from the camera comprise a radiograph viewing device area and a physical exhibit viewing device area.

10. A telesuite accordingly to claim 7, wherein said at least two of the plurality of predetermined viewing positions disposed substantially equidistant from the camera comprise a physical exhibit viewing device area and a health care practitioner viewing area.

11. A telesuite accordingly to claim 7, wherein said at least two of the plurality of predetermined viewing positions disposed substantially equidistant from the camera comprise a health care practitioner viewing area and a desk top area.

12. A telesuite accordingly to claim 7, wherein one of said plurality of predetermined viewing positions comprises any two predetermined viewing positions selected from the group comprising a computer monitor, a television, a medical device display, a medical instrument, a patient viewing area, a health care practitioner viewing area, a desk top area, a radiograph viewing device area, a physical exhibit viewing device area, and a mirror viewing area.

* * * * *